United States Patent [19]

Webster, III et al.

[11] 4,006,866
[45] Feb. 8, 1977

[54] ACRYLIC MODIFIED URETHANE BOBBIN FINISH

[75] Inventors: Walter C. Webster, III, Northbridge; Frank L. Allen, Jr., Hopedale, both of Mass.

[73] Assignee: Rockwell International Corporation, Pittsburgh, Pa.

[22] Filed: Jan. 29, 1976

[21] Appl. No.: 653,558

Related U.S. Application Data

[62] Division of Ser. No. 573,863, May 2, 1975.

[52] U.S. Cl. .................. 242/118.32; 427/407 R; 427/408; 428/425; 428/541
[51] Int. Cl.² .................. B65H 75/12; B32B 27/40
[58] Field of Search ............ 242/118.32, 118.3; 260/18 TN, 859; 428/423, 425, 541; 427/407 R, 407 D, 408, 411, 317

[56] References Cited

UNITED STATES PATENTS

| | | | |
|---|---|---|---|
| 2,993,807 | 7/1961 | Abbott et al. | 427/408 |
| 3,546,148 | 12/1970 | Diamond et al. | 260/18 TN |
| 3,664,861 | 5/1972 | Okamura et al. | 428/425 |
| 3,681,289 | 8/1972 | Kruse et al. | 428/423 |

Primary Examiner—George F. Lesmes
Assistant Examiner—R. J. Roche

[57] ABSTRACT

An improved wood textile bobbin which is provided with two layers of protective coatings, the first layer being made up of ricinoleate diphenyl methane diisocyanate prepolymer (MDI) trifunctional polyether polyol (TPP), and the second layer being composed of MDI, TPP, acrylic copolymer, and to a process for producing such a bobbin.

6 Claims, 2 Drawing Figures

ACRYLIC MODIFIED URETHANE BOBBIN FINISH

This is a division of application Ser. No. 573,863, filed May 2, 1975.

BACKGROUND OF THE INVENTION

Bobbins for use in weaving shuttles in the textile industry must be capable of handling a large variety of natural and synthetic yarns which, depending upon the particular yarn, can have a plurality of adverse effects on the life and operation of the bobbin. For example, wood bobbins which are used for some types of synthetic yarns must be able to withstand compressive forces that tend to cause crushing and splintering. Thus bobbins for use with these types of materials must be able to withstand greater forces than would ordinarily be encountered with most types of natural fiber yarns that possess lower tensile strengths. Additionally, with certain types of synthetics the abrasion of the bobbin is also aggravated and, further there is often left on the bobbin a tacky or rubbery coating that interferes with uniform payoff of the yarn from the bobbin. This latter difficulty is pronounced with yarns such as "Roto Set" yarns, which is a trademark for certain yarns produced by E. I. DuPont de Nemours and Company. These yarns are compact, multi-filament yarns wherein filament to filament spacing generally does not exceed one filament diameter and the filaments are generally intermingled.

Although, in the past, many types of surface finishes have been used to provide improved strengths, abrasion resistance and freedom from accreted filaments, only partial success has been achieved. U.S. Pat. No. 3,243,140 discloses certain coatings which are useful to solve some of the problems enumerated above, and this patent notes that conventional coatings such as lacquer, paint enamels, baked or unbaked varnishes, etc., have suffered operational limitations under certain conditions.

Further, in order to produce bobbins economically and expeditiously it is desirable that coating thicknesses be kept to a minimum and that drying time of the coatings be reduced to the lowest possible level and, further, that such drying be effected at ambient temperatures.

SUMMARY OF THE INVENTION

It is therefore a principle object of this invention to provide an improved wood bobbin having coatings which provide uniform wear resistance properties.

It is a further object of this invention to provide an improved wood bobbin in which a first protective coating is used to provide a coating that penetrates the surface of the bobbin thereby hardening the wood so as to make it more resistant to denting, decreases the rate of moisture absorption, and improves the adhesion of the total finish system, and a second protective coating which is provided over the first to provide a uniform surface finish from which textile yarn can be withdrawn evenly.

An additional object of this invention is to provide an improved wood bobbin in which two protective coatings are present and in which there is a diffusion layer existing between the two layers that provides an integral bond between these two layers.

It is a further object of this invention to provide an improved process for producing a wood textile bobbin having a two layer protective coating.

Still another object of this invention is to provide a process for producing a wood bobbin in which a first protective layer is adhered to the outer surface of the bobbin blank and a second protective layer is adhered directly to the surface of the first layer, before the first layer has completely cured.

Yet another object of this invention is to provide a process for producing a wood bobbin in which the last protective layer applied to the bobbin cures very rapidly to preclude the formation of contact marks as the bobbins move from conveyor to conveyor during the curing process.

These and other objects of the invention will be in part obvious and in part explained by reference to the accompanying specification and drawings in which:

DESCRIPTION OF THE INVENTION

Generally speaking, wood bobbins have been produced by coating bobbin blanks shaped from sources materially turning or otherwise shaping these blanks to essentially final bobbin size, applying a plurality of coatings to the exterior surfaces of the bobbin and then subsequently curing or drying the coatings. For example, one such superior finish used on rock maple bobbins was very costly due to high cost of labor to apply and subsequently cure the coatings. This particular baked enamel finish involved three coats of material which were applied by placing the bobbins on pin boards by hand, dipping the bobbins in enamel, each coat being baked five hours at 275° F. In an effort to overcome this arduous and costly procedure, quicker drying substances such as a moisture cured TDI (toluene diisocyanate) which possessed excellent physical properties and did not require baking were used. This particular coating operation was effected by means of centrifuging, rather than by hand dipping with drying being subsequently effected on a wire conveyor belt. However, even this coating material, and those of related compositions presented difficulties. Specifically health hazards were introduced because of the toxicity of the volatile fractions which were emitted from the TDI and because of a lack of hardness.

Figure 1:
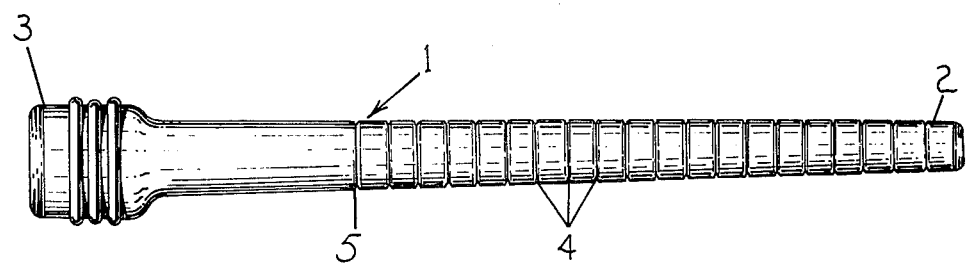
FIG. 1 of the drawings is a side elevation of a textile bobbin according to this invention.

As was set forth earlier, the present bobbin and bobbin coating compositions overcome the drawbacks or deficiencies which have heretofor existed. Referring to the drawings, in FIG. 1 the numeral 10 indicates a bobbin 1 of the type with which this invention is concerned and it comprises the usual barrel 2 for receiving weft yarn and a butt portion 3. The butt 3 is shown as having a series of annular recesses or grooves 4 which are for the purpose of receiving rings for receiving and clamping the bobbin into the usual bobbin spring. Additionally, the bobbin which is shown as having an exterior or outermost coating 5 that is of a composition to be subsequently described in detail.

Figure 2:
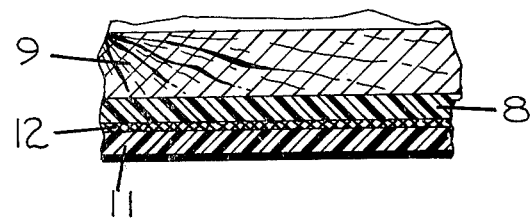
FIG. 2 is a greatly enlarged fragmentary view of the bobbin of FIG. 1 showing the protective coatings and the diffusion zone which exists therebetween.

As best seen in FIG. 2 of the drawings the protective coating 5 actually comprises two separate layers. Specifically a first or inner protective layer 8 which is adherent directly to and penetrates the exposed or outer surface 9 of the body of bobbin 1. There is also provided a second protective layer 11. An important feature of this invention is evidenced by the presence of the diffusion zone 12 that is formed and located between layers 8 and 11. The development of this zone is essential in order that the second layer 11 becomes intimately bonded to the first protective layer 8. Also the diffusion zone 12A, where layer 8 has penetrated the wood surface 9, thereby hardening the wood to a greater depth than is accomplished by usual finishes.

The function of first protective layer 8 is to fill in irregularities on the body 10 of bobbin 1 and harden the wood and for this reason should have a relatively high solids content with a low viscosity. The preferred first layer of this invention is a modified urethane which consists essentially of an MDI based 2 component urethane system made up of a ricinoleate diphenyl methanediisocyanate prepolymer and a trifunctional polyether polyol. The equivalent weight of the diisocyanate prepolymer is 200, NCO 21.0% having a viscosity of 21 centipoise at 25° C. The polyol is a polyoxypropylene derivative of trimethylolpropane with a hydroxy number of 404, acid number of 0.03 and a viscosity of 25 cps at 25° C. This composition has a lower order of toxicity than many previously used substances as well as improved hardness and greater toughness.

First layer 8 preferably contains 30 to 40% solids MDI prepolymer and functional polyether polyol with a NCO/OH ratio of MDI prepolymer to the trifunctional polyether polyol ranging from about 1/1 to 2/1. Suitable compositions for first layer 8 can be selected from the ranges listed in the table. All amounts stated in Table 1 are in parts by weight.

Table 1

| 20 | MDI prepolymer |
| 7–14 | trifunctional polyether polyol |
| 20–40 | xylene |
| 20–40 | ethylene glycol monethyl ether acetate |

Since first layer 8 is comparatively slow drying and of relatively low viscosity the second protective layer 11 is of a different composition that requires less drying time, which has increased viscosity for better coatability and which also has longer pot life. This layer 11 consists essentially of 20 to 30% solids, 30 to 50% thermoplastic acrylic copolymer by solids weight with the same molar ratio of 1/1 to 2/1 existing between the solids MDI prepolymer and the trifunctional polyether polyol NCO to OH groups. In the case of the second layer 11 compositions suitable proportions can be prepared in keeping with the ranges indicated in Table 2 in which all amounts are in parts by weight (PBW).

Table 2

| 20 | MDI prepolymer |
| 7–14 | trifunctional polyether polyol |
| 12–27 | thermoplastic acrylic copolymer |
| 45–122 | xylene |
| 45–122 | ethylene glycol monethyl ether acetate |

To prepare a bobbin according to the process of this invention coating material having compositions within the ranges stated in Tables 1 and 2 are prepared. A bobbin blank is shaped and dried so that it has a water content not in excess of 9%. The initial layer 8 is then applied to the outer surface of the bobbin to fill in surface irregularities, penetrate the wood and to provide the base for the subsequent, second protective layer 11. This initial layering can be accomplished by any of a number of suitable application methods but is best carried out by a spraying operation while tumbling since this provides a uniform coating of sufficient thickness to deliver a uniform surface that can receive the application of second layer 11. Upon completion of the spraying or initial layering step the bobbins are allowed to partially cure to provide a surface which can be readily handled without effecting the creation of serious surface imperfections.

An important step in the overall processing of the bobbins is that of insuring that the first protective layer 8 is not permitted to become completely cured. If total curing of the layer occurs then it would be impossible to adhere a second layer 11 thereto in such a way that it would not spall or chip off under operating conditions. In essence what occurs after second protective layer 11 is applied is that a diffusion zone, previously identified by numeral 12, is created between layers 8 and 11 which enables integral bonding between the layers. This is true chemical diffusion since components of each of the layers migrates into the other. Second layer 11 can also be applied by a variety of means but it has been found that a superior method for effecting application of the layer is by placing the bobbins in a centrifuging apparatus and applying what can be referred to as a spin coating to the bobbin. The thus coated bobbin is then removed from the centrifuge and permitted to dry in air on wire mesh belts. The curing time of the second protective layer 11 is such that in moving from belt to belt during the drying operation any contact marks that are made will heal themselves and final coating which is substantially free of defects is obtained.

Although the present invention has been described in connection with preferred embodiments, it is to be understood that modifications and variations may be resorted to without departing from the spirit and scope of the invention as those skilled in the art will readily understand. Such modifications and variations are considered to be within the purview and scope of the invention and the appended claims.

I claim:

1. A wood textile bobbin the wood of which has been dried to less than about 9% by weight of moisture, said bobbin comprising;
   a. a wood bobbin body;
   b. a first protective layer adherent directly to and penetrating the exposed surface of said bobbin body said first coating consisting essentially of ricinoleate diphenyl methane diisocyanate prepolymer and trifunctional polyether polyol;
   c. a second protective layer adherent directly to said first protective layer, said second protective coating consisting essentially of ricinoleate diphenyl methane diisocyanate prepolymer and trifunctional polyether polyol modified with 30% to 50% thermoplastic acrylic copolymer.

2. A textile bobbin as defined in claim 1 wherein the molar ratio of NCO to OH groups of said ricinoleate diphenyl methane diisocyanate prepolymer to said trifunctional polyether polyol ranges from about 1/1 to 2/1.

3. A textile bobbin as defined in claim 1 wherein said first protective applied layer coating formulation consists, in proportions, essentially of from about 20 parts by weight ricinoleate diphenyl methane diisocyanate prepolymer, 7-14 PBW trifunctional polyether polyol, 20-40 PBW xylene and 20-40 PBW ethylene glycol monethyl ether acetate.

4. A textile bobbin as defined in claim 1 wherein said second protective applied coating formulation consists, in proportions, essentially of from about 20 parts by weight (PBW) ricinoleate diphenyl methane diisocyanate prepolymer, 7-14 PBW trifunctional polyether polyol, 12-27 PBW thermoplastic acrylic copolymer 45-122 PBW xylene and 45-122 PBW ethylene glycol monethyl ether acetate.

5. A textile bobbin as defined in claim 3 wherein said second protective coating consists, in proportions, essentially of from about 20 parts by weight (PBW) ricinoleate diphenyl methane diisocyanate prepolymer, 7-14 PBW trifunctional polyether polyol, 12-27 PBW thermoplastic acrylic copolymer.

6. A textile bobbin as defined in claim 2 and wherein said first protective layer consists, in proportions, essentially of from about 20 parts by weight ricinoleate diphenyl methane diisocyanate prepolymer, 7-14 PBW trifunctional polyether polyol.

* * * * *